United States Patent [19]
Bartling et al.

[11] Patent Number: 5,377,292
[45] Date of Patent: Dec. 27, 1994

[54] OPTICAL FIBER WITH ADDITIONAL COLOR MARKINGS

[75] Inventors: Franz-Peter Bartling, Düsseldorf; Rainer Broden, Mönchengladbach; Helmut Haag, Titz; Michael Hoffart, Heiligenhaus; Hans-Jürgen Lysson, Korschenbroich; Peter Zamzow, Bochum, all of Germany

[73] Assignee: Kabel Rheydt A.G., Monchen-gladbach, Germany

[21] Appl. No.: 37,295

[22] Filed: Mar. 26, 1993

[30] Foreign Application Priority Data

Mar. 26, 1992 [DE] Germany .................. 4209830

[51] Int. Cl.⁵ .................. G02B 6/22; B05C 3/12; B05D 5/06
[52] U.S. Cl. .................. 385/128; 118/405; 385/123; 427/163.1
[58] Field of Search .................. 385/100–114, 385/123, 128, 141, 147; 427/163; 118/404, 405

[56] References Cited

U.S. PATENT DOCUMENTS

| | | | |
|---|---|---|---|
| 4,510,884 | 4/1985 | Rosebrooks | 118/405 |
| 4,629,285 | 12/1986 | Carter et al. | 385/128 |
| 4,900,126 | 2/1990 | Jackson et al. | 385/114 |
| 5,074,643 | 12/1991 | Petisce | 385/128 |
| 5,111,523 | 5/1992 | Ferlier et al. | 385/100 |
| 5,146,529 | 9/1992 | Mizutani | 385/103 |
| 5,151,306 | 9/1992 | Andrews et al. | 427/163 X |

*Primary Examiner*—John D. Lee
*Attorney, Agent, or Firm*—Ware, Fressola, Van Der Sluys & Adolphson

[57] ABSTRACT

To increase the identification characteristics of optical fibers (9) with one or more protective covers (10, 11) and an external color coating (12) of UV-hardened varnish, additional different color identification markings (13) are integrated into the external color coating (12).

12 Claims, 2 Drawing Sheets

OPTICAL FIBER WITH ADDITIONAL COLOR MARKINGS

TECHNICAL FIELD

The present invention concerns an optical fiber with one or more protective covers of polymer materials (coatings) and an external color coating of UV-hardened varnish.

BACKGROUND OF THE INVENTION

Glass fibers for the transmission of communications, drawn from so-called preforms, cannot be processed further in that condition. Just guiding the blank fiber over deflection pulleys makes it necessary to coat the fiber, to maintain its high starting strength. But protection prior to fiber bending (microbending) also makes it necessary to coat the individual fibers. For this purpose, one or more coatings, for example of a polymer material, are applied to the glass fiber jacket, where these show regular differences in their mechanical properties when applied in several layers. Thus, a relatively soft polymer coating can be applied to the blank fiber, as a so-called primary coating for protection prior to microbending, while a secondary coating with a material of increased E-modulus provides the external mechanical protection and increases the longitudinal rigidity of the fiber.

If a number of such protected fibers are placed in an optical cable, it is necessary to be able to identify the individual transmission elements, when such cables are installed. This purpose is served, for example, by a color coating applied to the outer cover, which surrounds it on all sides, but does not change the properties of the actual coating. However, such a color application surrounding the fiber is often not sufficient, to be able to keep the fibers of a cable reliably separate. For this reason, strands of the same color have already been provided with an annular marking, where the number of rings belonging together, or their distance, can be varied.

In this known marking process, the ring marking is performed in an additional work step, where solvent-containing identification colors are used, which must subsequently be subjected to a drying process. The adherence of the additional identification depends on the material used for the cover, or on the preparations that must be made before the marking process.

DISCLOSURE OF INVENTION

An object of the invention is to provide a way to apply additional permanent identification information to the fiber, without any further work steps.

Another object of the present invention is to provide an optical fiber having additional permanent identification information made without any further work steps.

According to the present invention, additional color identification markings are integrated into the external color coating. This arrangement of additional color identification markings within the color coating makes it possible to omit other color identification steps from the process. Furthermore, the additional identification is permanent, and accidental wiping or rubbing off is avoided. Every fiber is identifiable at all times.

As with the identification with one or more rings, the invention also permits a number of identification variations Thus, different color markings could e.g. be one or more identification lines or stripes distributed over the periphery and running longitudinally. As also provided by the invention, these lines or stripes may be spaced, and the chosen spacing distance can be varied further.

As provided by the invention, if a UV-hardened varnish is used for the external color coating, it has proven to be useful to select a corresponding varnish for the other color identification markings. The hardening of the varnish takes place practically at the same time as the application of the color coating covering the fiber and any additional marking. The varnish used for the additional color identification should have an acrylate, polyester or similar basis, and corresponding varnishes with the same hardening time can be used for the single color coating of the fiber and the additional color markings.

As provided by the invention, the integration of different color identification markings into the external color coating of the fiber makes it necessary for the UV-hardening varnish of the color coating and the other color identification markings to be applied at the same time. The geometric dimensions of the color identification markings can be controlled depending on the number of additional markings, or their arrangement on the surface of the fiber.

The effortless identification of individual fibers, which already have a basic color, requires that the additional color identification markings differ from the basic color and its arrangement according to their shape and/or selected color. A clear and unequivocal boundary is a prerequisite. For this reason, it was proven useful for the invention that the two colored varnishes used in the identification are of different flowability. This leads to clear boundary lines of the additional color markings in the area of the basic color, and the running together of the different color varnishes is avoided.

However, in this connection, a device that is adapted to the requirements of the marking is of special advantage. It is characterized by a tubular nozzle with an additional coating chamber and radial supply channels for the colored identification varnish. The annular coating chamber is equipped with a number of overflow channels according to the number of different color identification markings. The geometric dimensions of these overflow channels determine the size of the additional color marking during production, their arrangement in relation to the fiber determines the arrangement or the position of the color marking on the periphery of the fiber.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
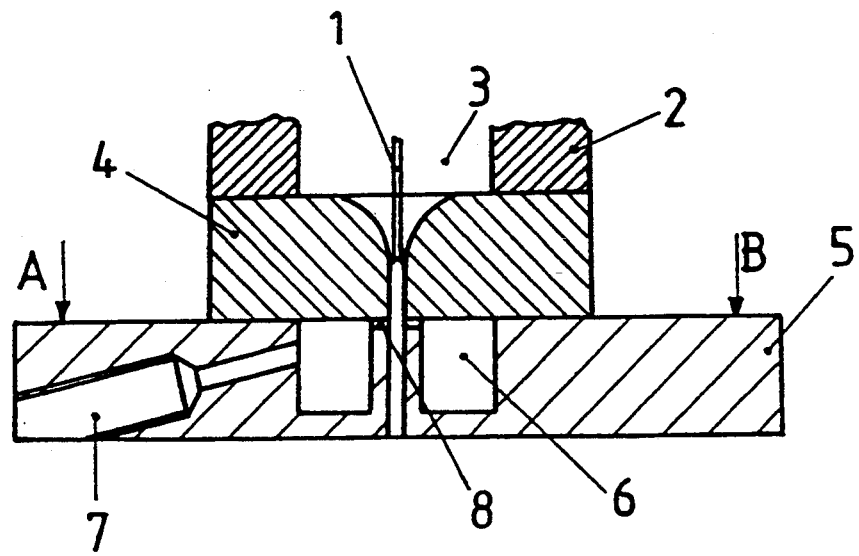
FIG. 1 shows a pair of coating devices, according to the present invention.

FIG. 1 shows a fiber 1, which was already coated in one or more previous work steps, passing through a schematically illustrated coating device 2, the intake 3 of which contains a sufficient amount of suitable color coating material. The coating material can be hardened or cross-linked by UV radiation; for example, suitable materials for the invention are acrylate or polyester-based varnishes and similar. The full color coating for the basic marking takes place in a coating nozzle 4.

Figure 2:
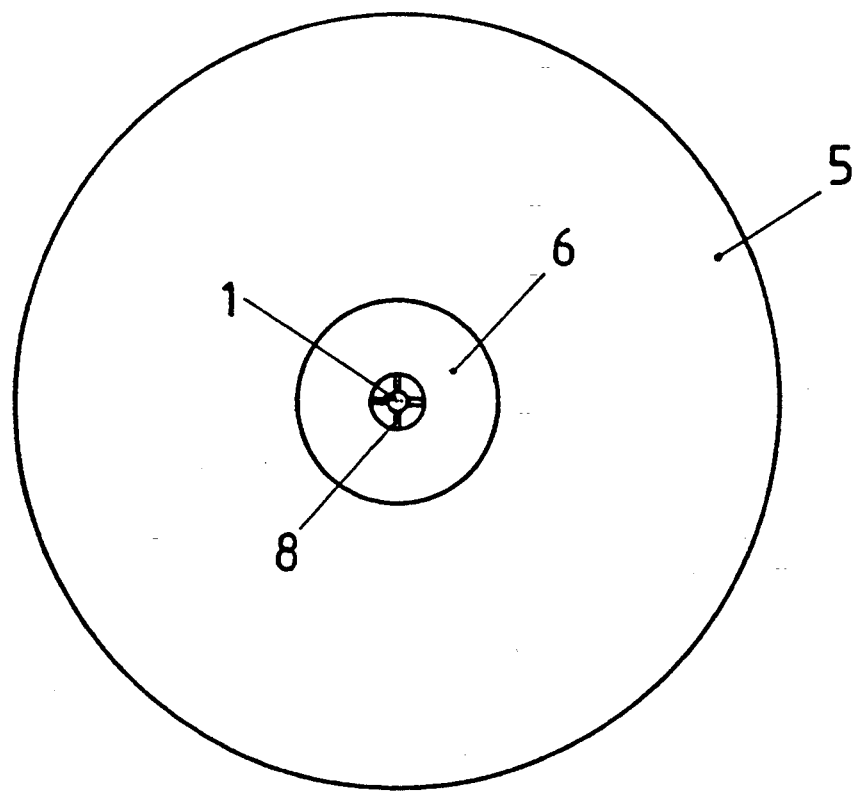
FIG. 2 is a section view of FIG. 1 along lines A-B thereof.

According to the invention, different color identification markings are integrated in the first color coating. To achieve this, the fiber 1, which already has the first color coat, enters a second coating device 5 located immediately behind the first coating device 2, as shown in FIG. 1. Thus, the additional color identification markings have already been applied before the first color coating has hardened. For this purpose, a distribution chamber 6 is located in the coating device 5; it contains the additional dye, for example a UV-hardening acrylate varnish. The varnish is dispensed by a line 7, which is connected to a dye supply. The distribution chamber 6, which surrounds the strand running through it, makes an additional color marking possible, for example longitudinal color stripes distributed over the periphery of the fiber. This is achieved with overflow channels 8, four of which are distributed around the periphery, for example as shown in a cross section along line A-B in FIG. 2.

Figure 3:
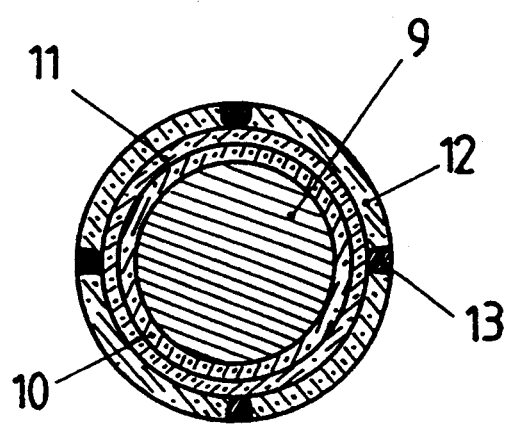
FIG. 3 is a section view of a fiber, according to the present invention.

Finally, FIG. 3 clarifies the arrangement of the additional color identification markings within the basic marking. Thus, the optical fiber 9 is surrounded by layers 10 and 11 of synthetic material, as so-called primary and secondary coatings, over which the single color marking 12 is located, which is applied by the coating device 2. Within this color marking 12, i.e. integrated into it, are four different color identification markings 13, running lengthwise, for example. Instead of the four lengthwise stripes distributed around the fiber 9 in FIG. 3, one or two lengthwise stripes, for example offset at 180°, can be produced as the additional marking of the fiber according to the invention process. The suitable geometry of the coating device 5, as well as careful adjustment of the parameters such as pressure and temperature, will prevent the mixing of the two types of identification during the practically simultaneous application of the dye to the fiber envelope, as well as undesirable discontinuities in the additional identification.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An optical fiber with one or more protective coverings of polymeric materials and a color coating of UV-hardened varnish on an outer surface of a last protective covering, wherein a different color identification marking material is interposed between parts of the color coating before hardening.

2. An optical fiber as in claim 1, wherein the different color identification marking is one or more longitudinal identification lines or stripes distributed around the periphery.

3. An optical fiber as in claim 2, wherein the identification stripes or lines are interrupted and spaced.

4. An optical fiber as in claim 1, wherein the different color identification marking comprises identification stripes or lines that are interrupted and spaced.

5. An optical fiber as in claim 1, wherein the material of the different color identification marking is also a UV-hardened varnish.

6. An optical fiber as in claim 5, wherein the material of the different color identification marking is a UV-hardened, acrylate-based varnish.

7. A process for coating an optical fiber with one or more protective coatings of polymer materials and a color coating of UV-hardened varnish, comprising the steps of: applying the UV-hardenable varnish of the color coating to the optical fiber and interposing a different color identification marking material in the color coating at the same time.

8. A process as in claim 7, further comprising the step of controlling said step of applying the different color identification marking material so as to control the geometric dimensions of the different color identification marking material.

9. A process as in claim 8, in which the UV-hardenable varnish of the color coating and the different color identification marking material have different flowabilities.

10. A process as in claim 7, in which UV-hardenable varnishes are used in the step of applying the color coating and in the step of applying the different color identification marking material, and wherein the flowability of the varnishes used in each step is different.

11. A device for performing a process of producing an optical fiber with one or more protective covers of polymer materials and a color coating of UV-hardened varnish, comprising: an annular coating nozzle for providing a first color identification varnish for the color coating and a second coating device having a coating chamber with radial supply channels for interposing a second color identification varnish from the coating chamber of the second coating device in the first color identification varnish.

12. A device as in claim 11, wherein the radial supply channels of the coating chamber of the second coating device are overflow channels corresponding to a selected number of different color identification markings for being applied by the second coating device.

* * * * *